US010733738B1

(12) United States Patent
Watson

(10) Patent No.: US 10,733,738 B1
(45) Date of Patent: *Aug. 4, 2020

(54) IMAGE ALIGNMENT CORRECTION FOR IMAGING PROCESSING DURING OPERATION OF AN UNMANNED AERIAL VEHICLE

(71) Applicant: Amazon Technologies, Inc., Seattle, WA (US)

(72) Inventor: Joshua John Watson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1 day.

This patent is subject to a terminal disclaimer.

(21) Appl. No.: 16/053,614

(22) Filed: Aug. 2, 2018

Related U.S. Application Data

(63) Continuation of application No. 15/173,378, filed on Jun. 3, 2016, now Pat. No. 10,074,183.

(51) Int. Cl.
*G06T 7/246* (2017.01)
*G06T 7/11* (2017.01)
*G06T 7/62* (2017.01)
*B64C 39/02* (2006.01)
*B64C 9/00* (2006.01)

(52) U.S. Cl.
CPC .................. *G06T 7/11* (2017.01); *B64C 9/00* (2013.01); *B64C 39/024* (2013.01); *G06T 7/246* (2017.01); *G06T 7/62* (2017.01); *B64C 2009/005* (2013.01); *B64C 2201/104* (2013.01); *B64C 2201/108* (2013.01); *B64C 2201/123* (2013.01); *G06T 2207/10032* (2013.01)

(58) Field of Classification Search
CPC ..... G06T 7/0075; G06T 7/2093; G06T 7/602; G06T 2207/10032; B64C 9/00; B64C 39/024; B64C 2201/108; B64C 2201/123; B64C 2201/104; B64C 2009/005; H04N 13/0239
USPC ........ 382/100, 154, 106, 285, 276; 345/418, 345/419, 427; 348/42, 47, 48, 144
See application file for complete search history.

(56) References Cited

U.S. PATENT DOCUMENTS

| | | | |
|---|---|---|---|
| 8,581,981 B2 | 11/2013 | Alley et al. | |
| 9,513,635 B1 | 12/2016 | Bethke et al. | |
| 9,568,802 B1 | 2/2017 | Powell et al. | |
| 10,074,183 B1 * | 9/2018 | Watson | B64C 39/024 |
| 2015/0237329 A1 | 8/2015 | Venkataraman et al. | |
| 2016/0267666 A1 | 9/2016 | Kim et al. | |
| 2017/0148168 A1 | 5/2017 | Lindner et al. | |

* cited by examiner

*Primary Examiner* — Sheela C Chawan
(74) *Attorney, Agent, or Firm* — Athorus, PLLC

(57) ABSTRACT

Described is an, such as an unmanned aerial vehicle ("UAV"), that includes stereo pairs of imaging element, each imaging element including a region of interest controller. The region of interest controller for an imaging element of the stereo pair receives movement information affecting the imaging element and selects a portion of pixels of a digital image formed by the imaging element. The portion of pixels are provided to an image processor that utilizes the portion of pixels to determine depth information for objects represented by the pixels.

20 Claims, 6 Drawing Sheets

IMAGE ALIGNMENT CORRECTION FOR IMAGING PROCESSING DURING OPERATION OF AN UNMANNED AERIAL VEHICLE

This application is a continuation of and claims priority to U.S. application Ser. No. 15/173,378, filed Jun. 3, 2016, allowed and now U.S. Pat. No. 10,074,183, entitled "Image Alignment Correction for imaging Processing During Operation of an Unmanned Aerial Vehicle," which is incorporated herein by reference in its entirety.

BACKGROUND

A digital image is a collection of pixels, typically arranged in an array, which defines an optically formed reproduction of one or more objects, backgrounds or other features of a scene. In a digital image, each of the pixels represents or identifies a color or other light condition associated with a portion of such objects, backgrounds or features. For example, a black-and-white digital image includes a single bit for representing a light condition of the pixel in a binary fashion (e.g., either black or white), while a grayscale digital image may represent the light condition in multiple bits (e.g., two to eight bits for defining tones of gray in terms of percentages or shares of black-and-white), and a color digital image may include groups of bits corresponding to each of a plurality of base colors (e.g., red, green or blue), and the groups of bits may collectively represent a color associated with the pixel. One common digital image is a twenty-four bit (24-bit) color digital image, in which each of the pixels includes three channels of eight bits each, including a first channel of eight bits for describing an extent of red within a pixel, a second channel of eight bits for describing an extent of green within the pixel, and a third channel of eight bits for describing an extent of blue within the pixel.

A depth image, or depth map is also a collection of pixels that defines an optically formed reproduction of one or more objects, backgrounds or other features of a scene. Unlike the pixels of a digital image, however, each of the pixels of a depth image represents or identifies not a light condition or color of such objects, backgrounds or features, but a distance to objects, backgrounds or features. For example, a pixel of a depth image may represent a distance between a sensor of an imaging device that captured the depth image (e.g., a depth camera or range sensor) and the respective object, background or feature to which the pixel corresponds.

A depth image or depth map can be determined by comparing two or more digital images that are obtained by cameras that are separated by a known baseline to determine a disparity between correlated pixels of the two or more digital images. The accuracy of the computed depth information of a depth map is often dependent on the accuracy of the baseline and the alignment or calibration of the two or more imaging elements. During operation of an aerial vehicle, such as an unmanned aerial vehicle (UAV), determining depth information, or distances between an object represented in images and the aerial vehicle is often important to ensure that the aerial vehicle can avoid those objects.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
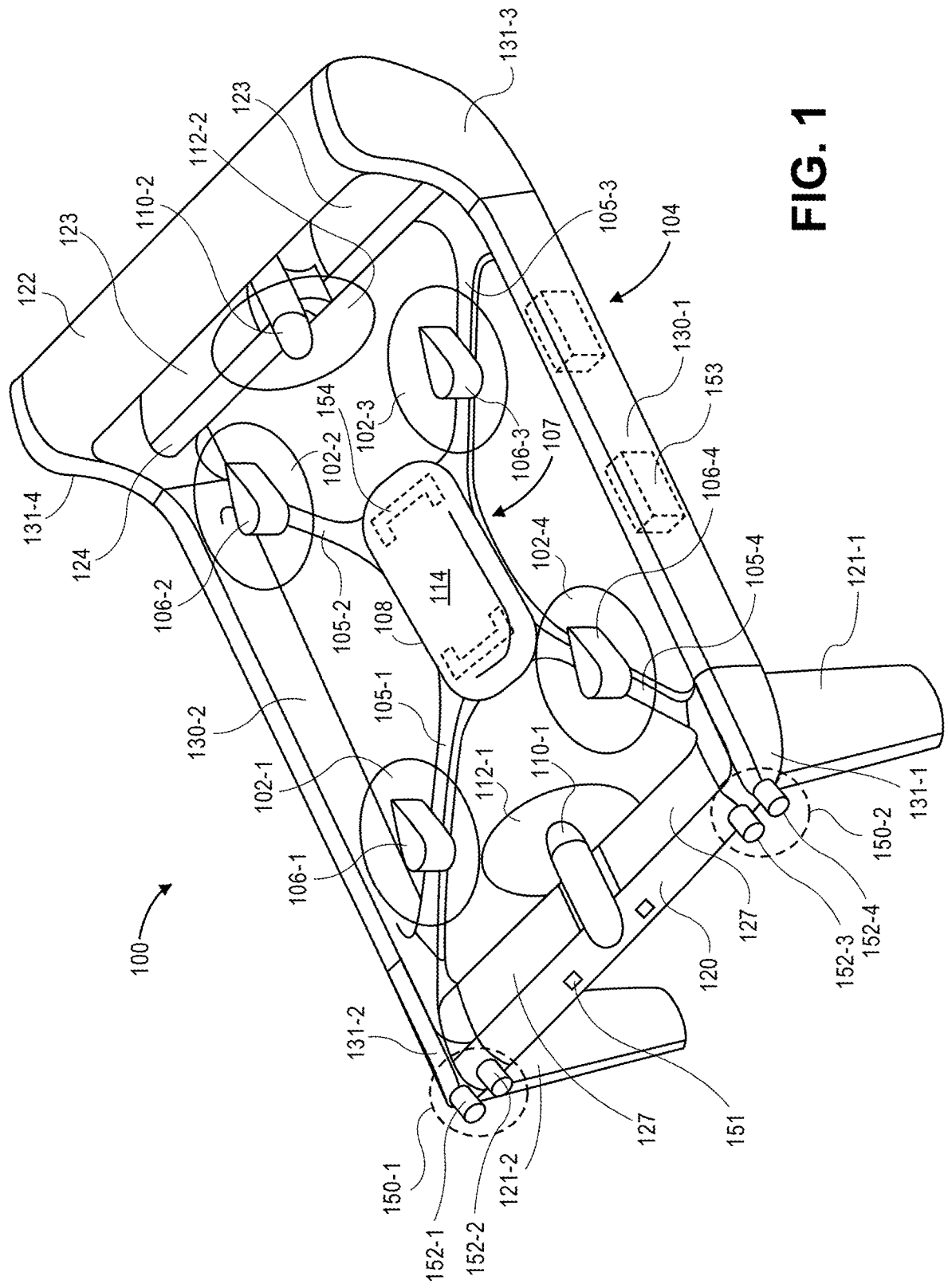
FIG. 1 depicts a view of an unmanned aerial vehicle configuration, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to." Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes a configuration of an aerial vehicle, such as an unmanned aerial vehicle ("UAV"), that includes stereo pairs of imaging element, each with region of interest controllers. Each imaging element of the stereo pair includes an image sensor that is used to form digital images representative of a field of view of the imaging element. The pixels of the digital image correspond to an array that is the size and shape of the image sensor. Likewise, each imaging element includes one or more movement sensors, such as accelerometers that measure movement affecting the imaging element during operation of the UAV. As discussed below, movement may be caused by vibration of the imaging element, bending or deflection of a portion of a frame of the aerial vehicle to which the imaging element is coupled, etc.

The region of interest controller for an imaging element of the stereo pair receives movement information affecting the imaging element and selects a portion of the pixels of the digital image that are to be used by the image processor with a digital image from the other imaging element of the stereo pair to compute depth information for objects represented by those pixels. The pixels within the region of interest may be determined based on the amount of measured movement and/or an offset caused by the movement when compared to a previously obtained digital image. A similar region of interest is determined by a region of interest controller of the second camera of the stereo pair and pixels within that region of interest are also sent to the image processor as the digital image.

By reducing the pixel arrays of each imaging element and selecting pixels within a region of interest that is determined based on movement of the imaging element at the time the image is generated, relative position of objects within the digital images provided to the image processor are stabilized. Accordingly, the depth information of objects is determined with a higher degree of accuracy and the position of the object is maintained.

In some implementations, the region of interest controller may also provide offset information to the image processor indicating an amount of offset that has been used in selecting the region of interest (e.g., the amount of movement). The image processor may use the offset information from each of the region of interest controllers of the stereo pair to adjust the baseline distance that is used when computing the depth information for objects represented in each of the digital images provided to the image processor.

FIG. 1 illustrates a view of an aerial vehicle, in this instance a UAV 100, according to an implementation. As illustrated, the UAV 100 includes a perimeter frame 104 that includes a front wing 120, a lower rear wing 124, an upper rear wing 122, and two horizontal side rails 130-1, 130-2. The horizontal side rails 130 are coupled to opposing ends of the front wing 120 and opposing ends of the upper rear wing 122 and lower rear wing 124. In some implementations, the coupling may be with a corner junction, such as the front left corner junction 131-1, the front right corner junction 131-2, the rear left corner junction 131-3, and the rear right corner junction 131-4. In such an example, the corner junctions are also part of the perimeter frame 104.

The components of the perimeter frame 104, such as the front wing 120, lower rear wing 124, upper rear wing 122, side rails 130-1, 130-2, and corner junctions 131 may be formed of any one or more suitable materials, such as graphite, carbon fiber, aluminum, titanium, etc., or any combination thereof. In the illustrated example, the components of the perimeter frame 104 of the UAV 100 are each formed of carbon fiber and joined at the corners using corner junctions 131. The components of the perimeter frame 104 may be coupled using a variety of techniques. For example, if the components of the perimeter frame 104 are carbon fiber, they may be fitted together and joined using secondary bonding, a technique known to those of skill in the art. In other implementations, the components of the perimeter frame 104 may be affixed with one or more attachment mechanisms, such as screws, rivets, latches, quarter-turn fasteners, etc., or otherwise secured together in a permanent or removable manner.

The front wing 120, lower rear wing 124, and upper rear wing 122 are positioned in a tri-wing configuration and each wing provides lift to the UAV 100 when the UAV is moving in a direction that includes a horizontal component. For example, the wings may each have an airfoil shape that causes lift due to the airflow passing over the wings during horizontal flight.

Opposing ends of the front wing 120 may be coupled to a corner junction 131, such as the front left corner junction 131-1 and front right corner junction 131-2. In some implementations, the front wing may include one or more flaps 127 or ailerons, that may be used to adjust the pitch, yaw, and/or roll of the UAV 100 alone or in combination with the lifting motors 106, lifting propellers 102, thrusting motors 110, thrusting propellers 112, and/or other flaps on the rear wings, discussed below. In some implementations, the flaps 127 may also be used as a protective shroud to further hinder access to the lifting propellers 102 by objects external to the UAV 100. For example, when the UAV 100 is moving in a vertical direction or hovering, the flaps 127 may be extended to increase the height of the protective barrier around a portion of the lifting propellers 102.

In some implementations, the front wing 120 may include two or more pairs of flaps 127, as illustrated in FIG. 1. In other implementations, for example if there is no front thrusting motor 110-1, the front wing 120 may only include a single flap 127 that extends substantially the length of the front wing 120. If the front wing 120 does not include flaps 127, the lifting motors 106 and lifting propellers 102, thrusting motors 110, thrusting propellers 112 and/or flaps of the rear wings may be utilized to control the pitch, yaw, and/or roll of the UAV 100 during flight.

Opposing ends of the lower rear wing 124 may be coupled to a corner junction 131, such as the rear left corner junction 131-3 and rear right corner junction 131-4. In some implementations, the lower rear wing may include one or more flaps 123 or ailerons, that may be used to adjust the pitch, yaw and/or roll of the UAV 100 alone or in combination with the lifting motors 106, lifting propellers 102, thrusting motors 110, thrusting propellers 112, and/or the flaps 127 of the front wing. In some implementations, the flaps 123 may also be used as a protective shroud to further hinder access to the lifting propellers 102 by objects external to the UAV 100. For example, when the UAV 100 is moving in a vertical direction or hovering, the flaps 123 may be extended, similar to the extending of the front flaps 127 of the front wing 120.

In some implementations, the rear wing 124 may include two or more flaps 123, as illustrated in FIG. 1 or two or more pairs of flaps, respectively. In other implementations, for example if there is no rear thrusting motor 110-2 mounted to the lower rear wing, the rear wing 124 may only include a single flap 123 that extends substantially the length of the lower rear wing 124. In other implementations, if the lower rear wing includes two thrusting motors, the lower rear wing may be configured to include three flaps 123, one on either end of the lower rear wing 124, and one between the two thrusting motors mounted to the lower rear wing 124.

Opposing ends of the upper rear wing 122 may be coupled to a corner junction 131, such as the rear left corner junction 131-3 and rear right corner junction 131-4. In some implementations, like the lower rear wing, the upper rear wing 122 may include one or more flaps or ailerons, that may be used to adjust the pitch, yaw and/or roll of the UAV 100 alone or in combination with the lifting motors 106, lifting propellers 102, thrusting motors 110, thrusting propellers 112, and/or other flaps of other wings. In some implementations, the flaps may also be used as a protective shroud to further hinder access to the lifting propellers 102 by objects external to the UAV 100. For example, when the UAV 100 is moving in a vertical direction or hovering, the flaps may be extended, similar to the extending of the front flaps 127 of the front wing 120 or the flaps 123 of the lower rear wing.

The front wing 120, lower rear wing 124, and upper rear wing 122 may be positioned and sized proportionally to provide stability to the UAV while the UAV 100 is moving in a direction that includes a horizontal component. For example, the lower rear wing 124 and the upper rear wing 122 are stacked vertically such that the vertical lift vectors generated by each of the lower rear wing 124 and upper rear wing 122 are close together, which may be destabilizing during horizontal flight. In comparison, the front wing 120 is separated from the rear wings longitudinally such that the vertical lift vector generated by the front wing 120 acts together with the vertical lift vectors of the lower rear wing 124 and the upper rear wing 122, providing efficiency, stabilization and control.

In some implementations, to further increase the stability and control of the UAV 100, one or more winglets 121, or stabilizer arms, may also be coupled to and included as part of the perimeter frame 104. In the example illustrated with respect to FIG. 1, there are two front winglets 121-1 and 121-2 mounted to the underneath side of the front left corner junction 131-1 and the front right corner junction 131-2, respectively. The winglets 121 extend in a downward direction approximately perpendicular to the front wing 120 and side rails 130. Likewise, the two rear corner junctions 131-3, 131-4 are also formed and operate as winglets providing additional stability and control to the UAV 100 when the UAV 100 is moving in a direction that includes a horizontal component.

The winglets 121 and the rear corner junctions 131 may have dimensions that are proportional to the length, width, and height of the UAV 100 and may be positioned based on the approximate center of gravity of the UAV 100 to provide stability and control to the UAV 100 during horizontal flight. For example, in one implementation, the UAV 100 may be approximately 64.75 inches long from the front of the UAV 100 to the rear of the UAV 100 and approximately 60.00 inches wide. In such a configuration, the front wing 120 has dimensions of approximately 60.00 inches by approximately 7.87 inches. The lower rear wing 124 has dimensions of approximately 60.00 inches by approximately 9.14 inches. The upper rear wing 122 has dimensions of approximately 60.00 inches by approximately 5.47 inches. The vertical separation between the lower rear wing and the upper rear wing is approximately 21.65 inches. The winglets 121 are approximately 6.40 inches wide at the corner junction with the perimeter frame of the UAV, approximately 5.91 inches wide at the opposing end of the winglet and approximately 23.62 inches long. The rear corner junctions 131-3, 131-4 are approximately 9.14 inches wide at the end that couples with the lower rear wing 124, approximately 8.04 inches wide at the opposing end, and approximately 21.65 inches long. The overall weight of the UAV 100 is approximately 50.00 pounds.

Coupled to the interior of the perimeter frame 104 is a central frame 107. The central frame 107 includes a hub 108 and motor arms 105 that extend from the hub 108 and couple to the interior of the perimeter frame 104. In this example, there is a single hub 108 and four motor arms 105-1, 105-2, 105-3, and 105-4. Each of the motor arms 105 extend from approximately a corner of the hub 108 and couple or terminate into a respective interior corner of the perimeter frame. In some implementations, each motor arm 105 may couple into a corner junction 131 of the perimeter frame 104. Like the perimeter frame 104, the central frame 107 may be formed of any suitable material, such as graphite, carbon fiber, aluminum, titanium, etc., or any combination thereof. In this example, the central frame 107 is formed of carbon fiber and joined at the corners of the perimeter frame 104 at the corner junctions 131. Joining of the central frame 107 to the perimeter frame 104 may be done using any one or more of the techniques discussed above for joining the components of the perimeter frame 104.

Lifting motors 106 are coupled at approximately a center of each motor arm 105 so that the lifting motor 106 and corresponding lifting propeller 102 are within the substantially rectangular shape of the perimeter frame 104. In one implementation, the lifting motors 106 are mounted to an underneath or bottom side of each motor arm 105 in a downward direction so that the propeller shaft of the lifting motor that mounts to the lifting propeller 102 is facing downward. In other implementations, as illustrated in FIG. 1, the lifting motors 106 may be mounted to a top of the motor arms 105 in an upward direction so that the propeller shaft of the lifting motor that mounts to the lifting propeller 102 is facing upward. In this example, there are four lifting motors 106-1, 106-2, 106-3, 106-4, each mounted to an upper side of a respective motor arm 105-1, 105-2, 105-3, and 105-4.

In some implementations, multiple lifting motors may be coupled to each motor arm 105. For example, while FIG. 1 illustrates a quad-copter configuration with each lifting motor mounted to a top of each motor arm, a similar configuration may be utilized for an octo-copter. For example, in addition to mounting a motor 106 to an upper side of each motor arm 105, another lifting motor may also be mounted to an underneath side of each motor arm 105 and oriented in a downward direction. In another implementation, the central frame may have a different configuration, such as additional motor arms. For example, eight motor arms may extend in different directions and a lifting motor may be mounted to each motor arm.

The lifting motors may be any form of motor capable of generating enough rotational speed with the lifting propellers 102 to lift the UAV 100 and any engaged payload, thereby enabling aerial transport of the payload.

Mounted to each lifting motor 106 is a lifting propeller 102. The lifting propellers 102 may be any form of propeller (e.g., graphite, carbon fiber) and of a size sufficient to lift the UAV 100 and any payload engaged by the UAV 100 so that the UAV 100 can navigate through the air, for example, to deliver a payload to a delivery location. For example, the lifting propellers 102 may each be carbon fiber propellers having a dimension or diameter of twenty-four inches. While the illustration of FIG. 1 shows the lifting propellers 102 all of a same size, in some implementations, one or more of the lifting propellers 102 may be different sizes and/or dimensions. Likewise, while this example includes four lifting propellers 102-1, 102-2, 102-3, 102-4, in other implementations, more or fewer propellers may be utilized as lifting propellers 102. Likewise, in some implementations, the lifting propellers 102 may be positioned at different locations on the UAV 100. In addition, alternative methods of propulsion may be utilized as "motors" in implementations described herein. For example, fans, jets, turbojets, turbo fans, jet engines, internal combustion engines, and the like may be used (either with propellers or other devices) to provide lift for the UAV.

In addition to the lifting motors 106 and lifting propellers 102, the UAV 100 may also include one or more thrusting motors 110 and corresponding thrusting propellers 112. The thrusting motors and thrusting propellers may be the same or different than the lifting motors 106 and lifting propellers 102. For example, in some implementations, the thrusting propellers may be formed of carbon fiber and be approximately eighteen inches long. In other implementations, the thrusting motors may utilize other forms of propulsion to propel the UAV. For example, fans, jets, turbojets, turbo fans, jet engines, internal combustion engines, and the like may be used (either with propellers or with other devices) as the thrusting motors.

The thrusting motors and thrusting propellers may be oriented at approximately ninety degrees with respect to the perimeter frame 104 and central frame 107 of the UAV 100 and utilized to increase the efficiency of flight that includes a horizontal component. For example, when the UAV 100 is traveling in a direction that includes a horizontal component, the thrusting motors may be engaged to provide a horizontal thrust force via the thrusting propellers to propel the UAV 100 horizontally. As a result, the speed and power utilized by the lifting motors 106 may be reduced. Alternatively, in selected implementations, the thrusting motors may be oriented at an angle greater or less than ninety degrees with respect to the perimeter frame 104 and the central frame 107 to provide a combination of thrust and lift.

In the example illustrated in FIG. 1, the UAV 100 includes two thrusting motors 110-1, 110-2 and corresponding thrusting propellers 112-1, 112-2. Specifically, in the illustrated example, there is a front thrusting motor 110-1 coupled to and positioned near an approximate mid-point of the front wing 120. The front thrusting motor 110-1 is oriented such that the corresponding thrusting propeller 112-1 is positioned inside the perimeter frame 104. The second thrusting motor is coupled to and positioned near an approximate mid-point of the lower rear wing 124. The rear thrusting motor 110-2 is oriented such that the corresponding thrusting propeller 112-2 is positioned inside the perimeter frame 104.

While the example illustrated in FIG. 1 illustrates the UAV with two thrusting motors 110 and corresponding thrusting propellers 112, in other implementations, there may be fewer or additional thrusting motors and corresponding thrusting propellers. For example, in some implementations, the UAV 100 may only include a single rear thrusting motor 110 and corresponding thrusting propeller 112. In another implementation, there may be two thrusting motors and corresponding thrusting propellers mounted to the lower rear wing 124. In such a configuration, the front thrusting motor 110-1 may be included or omitted from the UAV 100. Likewise, while the example illustrated in FIG. 1 shows the thrusting motors oriented to position the thrusting propellers inside the perimeter frame 104, in other implementations, one or more of the thrusting motors 110 may be oriented such that the corresponding thrusting propeller 112 is oriented outside of the protective frame 104.

The perimeter frame 104 provides safety for objects foreign to the UAV 100 by inhibiting access to the lifting propellers 102 from the side of the UAV 100, provides protection to the UAV 100, and increases the structural integrity of the UAV 100. For example, if the UAV 100 is traveling horizontally and collides with a foreign object (e.g., wall, building), the impact between the UAV 100 and the foreign object will be with the perimeter frame 104, rather than a propeller. Likewise, because the frame is interconnected with the central frame 107, the forces from the impact are dissipated across both the perimeter frame 104 and the central frame 107.

The perimeter frame 104 also provides a surface upon which one or more components of the UAV 100 may be mounted. Alternatively, or in addition thereto, one or more components of the UAV may be mounted or positioned within the cavity of the portions of the perimeter frame 104. For example, one or more antennas may be mounted on or in the front wing 120. The antennas may be used to transmit and/or receive wireless communications. For example, the antennas may be utilized for Wi-Fi, satellite, near field communication ("NFC"), cellular communication, or any other form of wireless communication. Other components, such as imaging elements (e.g., cameras), time of flight sensors, accelerometers, inclinometers, distance-determining elements, gimbals, Global Positioning System (GPS) receiver/transmitter, radars, illumination elements, speakers, and/or any other component of the UAV 100 or the aerial vehicle control system (discussed below), etc., may likewise be mounted to or in the perimeter frame 104. Likewise, identification or reflective identifiers may be mounted to the perimeter frame 104 to aid in the identification of the UAV 100.

In some implementations, as discussed below, one or more stereo pairs 150-1, 150-2, each of which include two or more imaging elements 152, are position on the aerial vehicle. In this example, there are two stereo pairs 150-1 and 150-2. The first stereo pair 150-1 includes two imaging elements 152-1, 152-2 that are separated by a defined distance, referred to herein as a baseline or baseline distance. The second stereo pair 150-2 includes two imaging elements 152-3, 152-4 that are also separated by a defined baseline distance. The baseline distance between the two imaging elements of the two stereo pairs may be the same or different. The larger the baseline distance there higher the potential for movement between the two imaging elements 152 of the stereo pair 150. For example, if the imaging elements 152-1, 152-2, are separated by approximately thirty centimeters (cm) there is a higher potential for deflection, bending or torque of the frame between the two imaging elements 152-1, 152-2 that will result in movement of one or both of the imaging elements 152-1, 152-2.

The paired imaging elements may be, for example, digital still cameras, red, green, blue (RGB) cameras, video cameras, thermographic cameras, etc., that are controlled by an image processor so that the pair of imaging elements obtain images at approximately a same time. Likewise, one or more distance determining elements 151 may be coupled to the frame of the aerial vehicle. Any type of distance determining element may be utilized, including, but not limited to, a time-of-flight sensor, range finder, SONAR, LIDAR, etc.

Each stereo pair 150 of imaging elements are arranged such that at least a portion of the field of view of each imaging element overlaps. As discussed further below, each imaging element of a stereo pair 150 may include a movement sensor and a region of interest controller that selects a portion of pixels from the image sensor. The selected portion of pixels are provided to the image processor. The image processor compares pixels received from each of the pair of imaging elements to generate a depth map corresponding to depth information for objects represented in the images.

The stereo pairs 150 may be affixed to any portion of the frame of the UAV 100. For example, the stereo pairs 150-1, 150-2 may be arranged along the front of the front wing 120. As another example, a stereo pair of imaging elements may be arranged along the underneath or lower side of the side rail 130-1 and/or side rail 130-2. As will be appreciated, any number of stereo pairs may be included on the UAV 100 and oriented in any direction.

In some implementations, the perimeter frame 104 may also include a permeable material (e.g., mesh, screen) that extends over the top and/or lower surface of the perimeter frame 104 enclosing the central frame, lifting motors, and/or lifting propellers.

An aerial vehicle control system 114 is also mounted to the central frame 107. In this example, the aerial vehicle control system 114 is mounted to the hub 108 and is enclosed in a protective barrier. The protective barrier may provide the control system 114 weather protection so that the UAV 100 may operate in rain and/or snow without disrupting the control system 114. In some implementations, the protective barrier may have an aerodynamic shape to reduce drag when the UAV is moving in a direction that includes a horizontal component. The protective barrier may be formed of any materials including, but not limited to, graphite-epoxy, Kevlar, and/or fiberglass. In some implementations, multiple materials may be utilized. For example, Kevlar may be utilized in areas where signals need to be transmitted and/or received.

Likewise, the UAV 100 includes one or more power modules 153. In some implementations, the power modules 153 may be positioned inside the cavity of the side rails 130-1, 130-2. In other implementations, the power modules may be mounted or positioned at other locations of the UAV. The power modules for the UAV may be in the form of battery power, solar power, gas power, super capacitor, fuel cell, alternative power generation source, or a combination thereof. For example, the power modules may each be a 6000 mAh lithium-ion polymer battery, or polymer lithium ion (Li-poly, Li-Pol, LiPo, LIP, PLI or Lip) battery. The power module(s) are coupled to and provide power for the aerial vehicle control system 114, the lifting motors 106, the thrusting motors 110, the stereo pairs 150, and the payload engagement mechanism 154.

In some implementations, one or more of the power modules may be configured such that it can be autonomously removed and/or replaced with another power module while the UAV is landed or in flight. For example, when the UAV lands at a location, the UAV may engage with a charging member at the location that will recharge the power module.

As mentioned above, the UAV 100 may also include a payload engagement mechanism 154. The payload engagement mechanism 154 may be configured to engage and disengage items and/or containers that hold items (payload). In this example, the payload engagement mechanism 154 is positioned beneath and coupled to the hub 108 of the frame 104 of the UAV 100. The payload engagement mechanism 154 may be of any size sufficient to securely engage and disengage a payload. In other implementations, the payload engagement mechanism 154 may operate as the container that contains item(s). The payload engagement mechanism 154 communicates with (via wired or wireless communication) and is controlled by the aerial vehicle control system 114.

Figure 2:
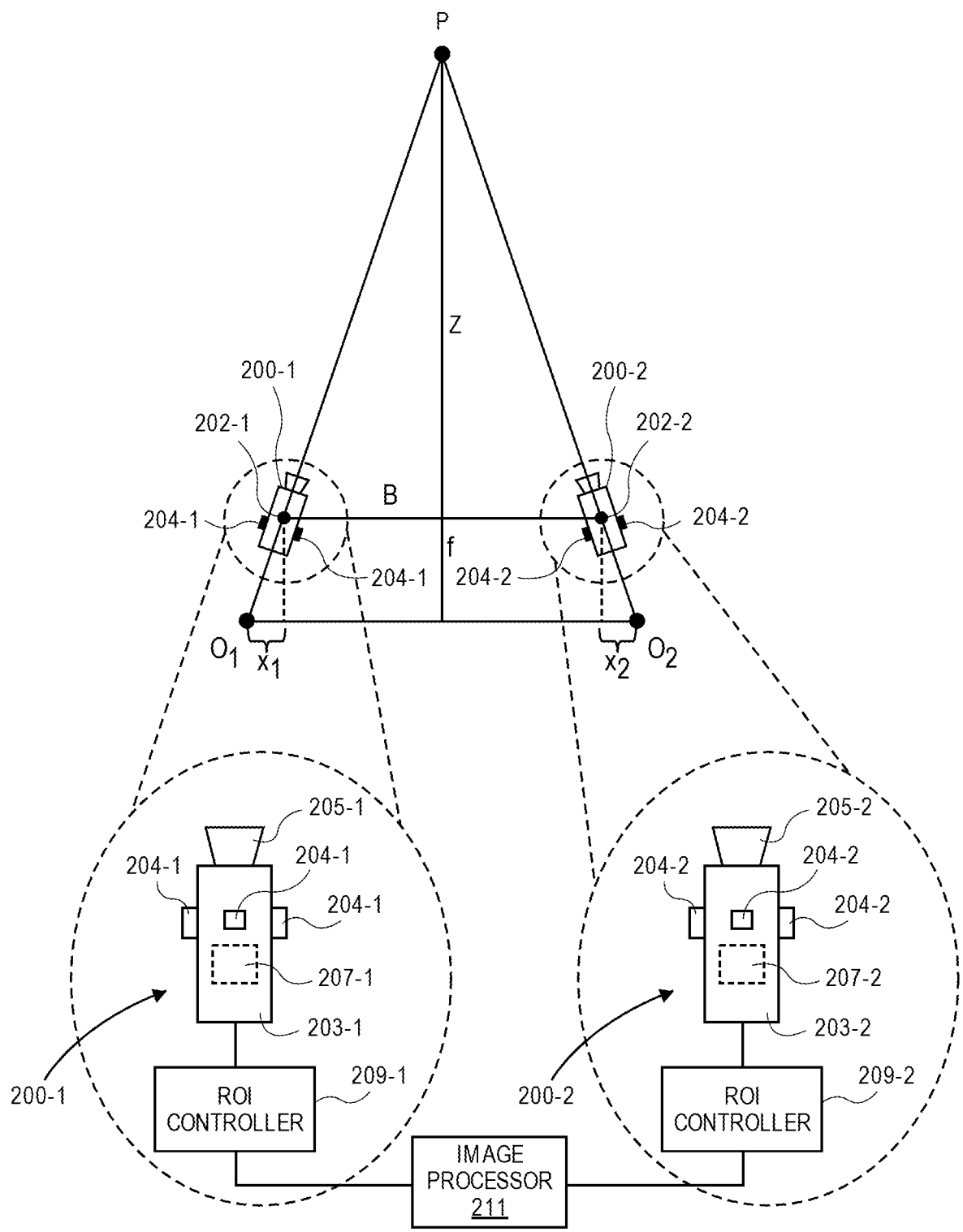
FIG. 2 depicts a view of a stereo pair of imaging elements, each with a region of interest controller, according to an implementation.

FIG. 2 depicts a view of a stereo pair of imaging elements 200, each with a region of interest controller 209, according to an implementation. Referring first to the first imaging element 200-1, the imaging element includes a lens 205-1 and an image sensor 207-1. The lens may be a standard lens, such as a fixed focal length digital camera lens that has a field of view. For example, the field of view may be approximately sixty degrees. In other implementations, other types of lenses and/or fields of view may be utilized. The image sensor may be any type of image sensor, such as a semiconductor charge-coupled device (CCD) or active pixel sensors in complementary metal-oxide-semiconductor (CMOS) or N-type metal-oxide-semiconductor (NMOS) technologies. Generally described, the image sensor may be any sensor that is capable of detecting and conveying image information. Image information for a sensor typically includes an array of pixels, each pixel representing a color corresponding to that portion of the image. For purposes of this disclosure, the pixel array corresponding to an image sensor of an imaging element will be referred to herein as the absolute pixel array. Likewise, each pixel of the absolute pixel array is arranged according to a column row configuration. For example, the pixel corresponding to the upper left of the absolute pixel array, and thus the upper left of the image sensor, may be references as pixel (OA, OA), the first position corresponding to the column and the second position corresponding to the row of the absolute pixel array.

The imaging element 200-1 also includes one or more movement sensors 204-1. The movement sensors may be any type of sensor that can measure a movement (vibration, torque, deflection, bending, etc.) that is acting upon or affecting the imaging element 200-1. For example, the movement sensor may be a 6-axis force torque sensor, a micro-vibration sensor, an accelerometer, a gyroscope, and/or any other type of device that can be used to measure a movement acting upon or affecting the imaging element. The movement sensor(s) may be coupled to any portion of the imaging element 200-1. For example, the movement sensor(s) may be coupled to the lens 205-1 of the imaging element 200-1, the body 203-1 of the imaging element, etc.

Finally, the imaging element 200-1 also includes a region of interest ("ROI") controller 209-1. As discussed further below, the ROI controller 209-1 receives the pixel information for the absolute pixel array from the image sensor 207-1 and the movement information from the movement sensors 204-1 and determines a region of interest that includes pixels to be provided to the image processor 211 as the digital image generated by the imaging element 200-1. The region of interest corresponds to an array of pixels within the absolute pixel array. For purposes of this discussion, and to distinguish the absolute pixel array from the pixels selected as the region of interest, the array of pixels that correspond to the region of interest will be referred to herein as the ROI pixel array.

The image processor 211 receives the digital image from the imaging element 200-1, which includes the pixels of the ROI pixel array, and utilizes the pixels of the ROI pixel array with pixels received from the second imaging element 200-2 of the stereo pair to generate a depth map that provides depth information for objects represented in the images. In some implementations, the digital image received by the image processor 211 may include pixels of the ROI pixel array and not include pixels from the absolute pixel array that are not also included in the ROI pixel array. Alternatively, the digital image received by the image processor 211 may include all pixels of the absolute pixel array and include metadata indicating the position of the ROI pixel array and/or indicating the pixels included in the ROI pixel array.

Similar to the first imaging element 200-1, the second imaging element 200-2 includes a lens 205-2 and an image sensor 207-2. The lens may be a standard lens, such as a fixed focal length digital camera lens that has a field of view. For example, the field of view may be approximately sixty degrees. In other implementations, other types of lenses and/or fields of view may be utilized. In some implementations, the lens of the first imaging element and the second imaging element may the same type of lens. In other implementations, the lenses of the two imaging element 200-1, 200-2 may be different. The image sensor 207-2 may be any type of image sensor, such as a semiconductor charge-coupled device (CCD) or active pixel sensors in complementary metal-oxide-semiconductor (CMOS) or N-type metal-oxide-semiconductor (NMOS) technologies.

The imaging element 200-2 also includes one or more movement sensors 204-2. The movement sensors may be any type of sensor that can measure a movement (vibration, torque, deflection, bending, etc.) that is acting upon or affecting the imaging element 200-2. For example, the movement sensor may be a 6-axis force torque sensor, a micro-vibration sensor, an accelerometer, a gyroscope, and/or any other type of device that can be used to measure a movement acting upon or affecting the imaging element 200-2. The movement sensor(s) may be coupled to any portion of the imaging element 200-2. For example, the movement sensor(s) may be coupled to the lens 205-2 of the imaging element 200-2, the body 203-2 of the imaging element, etc.

Finally, the imaging element 200-2 also includes a region of interest ("ROI") controller 209-2. As discussed further below, the ROI controller 209-2 receives the pixel information for the absolute pixel array from the image sensor 207-2 and the movement information from the movement sensors 204-2 and determines a ROI pixel array of pixels that are provided to the image processor 211 as the digital image generated by the imaging element 200-2.

The image processor 211 receives the digital image from the imaging element 200-1, which includes the pixels of the ROI pixel array from the absolute pixel array corresponding to image sensor 207-1 and the digital image from the imaging element 200-2, which includes the pixels of the ROI pixel array from the absolute pixel array corresponding to image sensor 207-2. As discussed below with respect to FIG. 3, the pixels from the two ROI pixel arrays are correlated to generate a depth map.

Many different techniques may be used to correlate pixels between two digital images to determine disparity. For example, a sum of squared differences, sum of absolute differences, cross correlation, normalized correlation, mutual correlation, or mutual information processing methods may be utilized to correlate pixels between images to determine disparity between the pixels. Based on the disparity between the two images and the known baseline, the distance between the stereo pair and the object can be determined.

For example, referring to FIG. 2, the baseline distance (B) is a known distance between the first imaging element 200-1 and the second imaging element 200-2 of the stereo pair. The focal length (f) corresponds to each of the imaging elements, and the disparity ($x_1$, $x_2$) corresponds to the amount of disparity determined for correlated pixels between the two images. The displacement, or distance (Z) between the stereo pair and the object (P) is inversely proportional to the disparity between correlated pixels. Specifically:

$$Z = \frac{f * B}{x_1 + x_2}$$

While such information is useful, it may be inaccurate if the position of one or both of the imaging elements is affected due to movement. For example, if the stereo pair is included on a UAV, as discussed above, one or both of the imaging elements may be affected by movement during operation of the UAV. Such movement may be the result of, for example, vibration of the imaging element during flight, bending, twisting, deflection, etc., of a frame between the two imaging element or to which the imaging element is coupled, etc. Not only will the movement potentially alter the baseline, and thus the computed disparity and/or displacement of the objects, the position of the detected objects between images taken over a period of time may appear to move (e.g., shake) because different regions of pixels will represent the object in different images.

The ROI controller reduces the negative effects of movement by selecting a region of interest that includes a subset of pixels from the absolute pixel array that are utilized by the image process 211 to determine depth information. For example, the movement sensor 204, imaging element 200, and the image sensor 207 of each imaging element 200-1, 200-2 may be calibrated at an original position of the respective imaging element 200. The movement sensor may measure an amount and direction of a movement of the imaging element at the time each digital image is generated by the imaging element. The ROI controller may utilize the measured movement to select and position a region of interest so that images provided to the imaging processor 211 appear stable.

Figure 3:
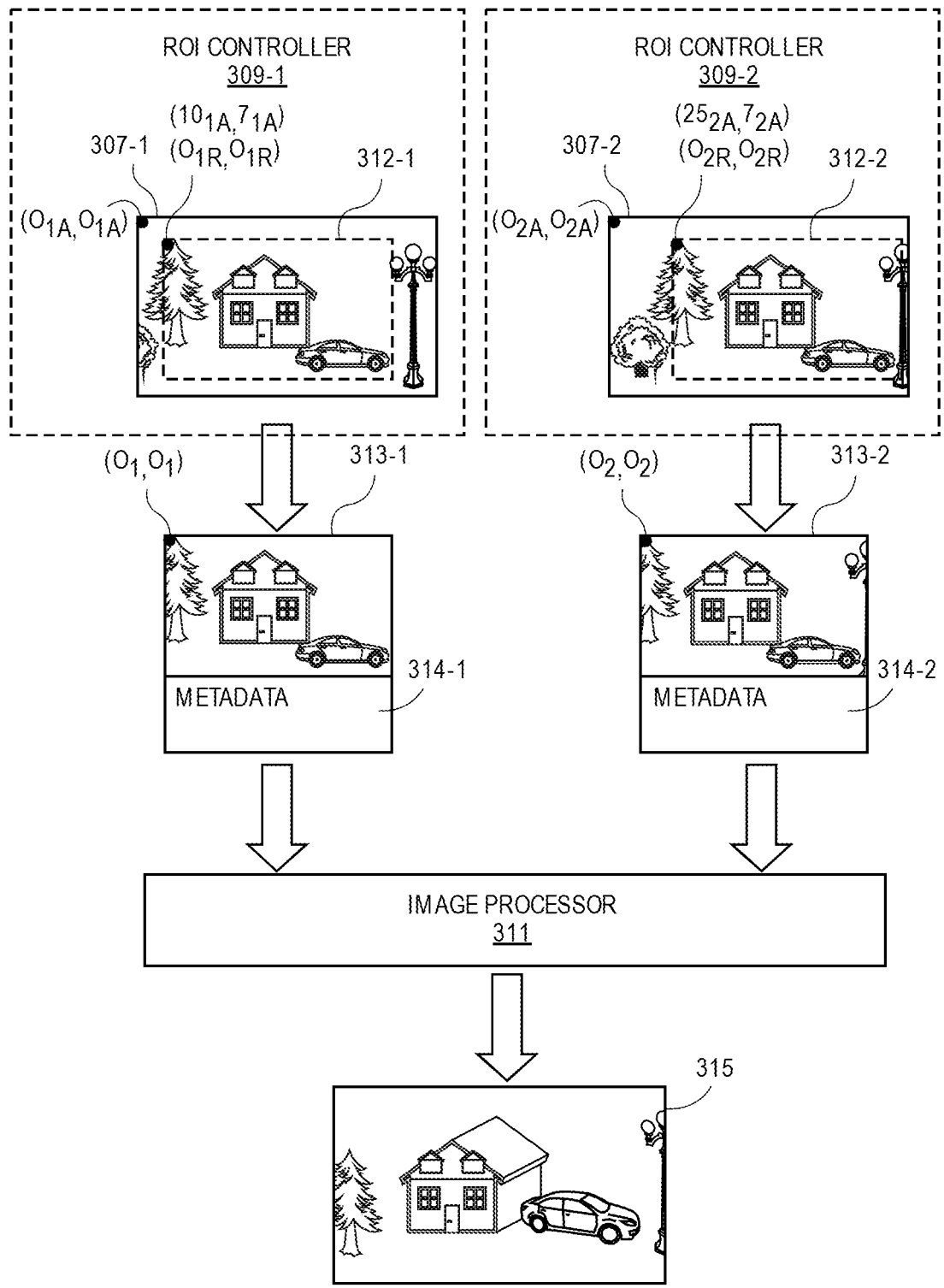
FIG. 3 depicts a view of images processed by each of the region of interest controllers and an image processor, according to an implementation.

For example, FIG. 3 depicts a view of images processed by each of the region of interest controllers 309-1, 309-2 and an image processor 311, according to an implementation. Each of the ROI controllers 309-1, 309-2 receive images of a scene taken from different perspectives. As discussed above, the images include pixels of the absolute pixel values corresponding to an array of the image sensor. For example, the pixel at position ($0_{1A}$, $0_{1A}$) corresponds to the pixel in the first column and first row of pixels corresponding to the sensor array of the first imaging element of the stereo pair. Likewise, the pixel at position ($0_{2A}$, $0_{2A}$) corresponds to the pixel in the first column and first row of pixels corresponding to the sensor array of the second imaging element of the stereo pair. As will be appreciated, other techniques for addressing pixel positions may likewise be utilized with the implementations discussed herein.

Based on the measured movement, each the ROI controller 309-1, 309-2 selects a region of interest 312. The selected region of interest may be any size of pixel array. For example, if there is no measured movement, the ROI pixel array may be equal to the size of the absolute pixel array. Alternatively, in some implementations, the maximum size of the ROI pixel array may be 90% the size of the absolute pixel array. In other implementations, the maximum size of the ROI pixel array may be greater or less than 90% of the absolute pixel array. Likewise, as discussed below, in some implementations, the size of the ROI pixel array for a region of interest may vary based on the amount of measured movement. In such implementations, the ROI controllers 309-1, 309-2 may communicate such that the same size ROI pixel array is used by each ROI controller.

Upon selection of a size of the ROI pixel array, each ROI controller 309 determines pixels of the absolute pixel array that are to be included in the respective ROI pixel array (i.e., the ROI pixel controller determines a position for the ROI pixel array within the absolute pixel array). For example, the position of the ROI pixel array may correspond to an amount of movement of the imaging element, as measured by the movement sensor. In another implementation, the position of the ROI pixel array may be based on a difference between the movement of the imaging element between the time the digital image was generated and the time at which a prior digital image was generated by the imaging element.

In the illustrated example, the ROI controller 309-1 has selected a region of interest that corresponds to a ROI pixel array that is smaller than the absolute pixel array 307-1. The position of the ROI pixel array 312-1 is determined such that the pixel in the first column of the region of interest, identified as ($0_{1R}$, $0_{1R}$), corresponds to the pixel of the absolute pixel array ($10_{1A}$, $7_{1A}$). ROI controller 309-2 has selected a region of interest that corresponds to a ROI pixel array 312-2 that is smaller than the absolute pixel array 307-2 and that is the same size as ROI pixel array 312-1. The position of the ROI pixel array 312-2 is determined such that the pixel in the first column of the region of interest, identified as ($0_{2R}$, $0_{2R}$), corresponds to the pixel of the absolute pixel array ($25_{2A}$, $7_{2A}$).

The ROI controllers 309-1, 309-2 each generate a digital image that is provided to the image processor 311. For example, ROI controller 309-1 generates a digital image 313-1 that includes pixels within the ROI pixel array 312-1 and provides that digital image 313-1 to the image processor 311. In some implementations, the digital image may only include the pixels within the ROI pixel array and not include pixels of the absolute pixel array that are not also included in the ROI pixel array, as illustrated. In such an example, the position of the pixels may be updated such that the pixel of the first row of the digital image 313-1, which originally corresponded to the absolute pixel at ($10_{1A}$, $7_{1A}$), corresponds to the first column and first row ($0_1$, $0_1$) as represented in the digital image 313-1. Likewise, the position of the pixel of the first row of the digital image 313-2, which originally corresponded to the absolute pixel at ($25_{2A}$, $7_{2A}$) may be updated to correspond to the first column and first row ($0_2$, $0_2$) as represented in the digital image 313-2. The metadata 314-1, 314-2 may provide, among other information, an indication of an amount of movement of the imaging element that was measured at the time the image was generated.

In other implementations, the digital images 313-1, 313-2 may include all pixels of the respective absolute pixel arrays 307-1, 307-2 and metadata 314-1, 314-2 that indicates a size and position of the respective regions of interest determined by the region of interest controllers 309-1, 309-2.

The image processor 311 receives the digital images 313-1, 313-2 and correlates the pixels based on existing calibration information for the two imaging elements of the stereo pair and based on the metadata (e.g., movement of the imaging elements) to determine depth information, including image disparity and displacement. For example, the image processor may increase or decrease the baseline distance based on the measured movement of the two imaging elements with respect to an original baseline distance. Pixel correlation and determination of image disparity and displacement may then be performed using any of the correlation techniques known in the art to generate depth information, as illustrated by the depth information 315.

This process may be performed for each image obtained over a period of time such that the position of objects represented in the resulting depth information remain in a position as if the imaging elements had not been vibrating. Likewise, the accuracy of the depth information and displacement is increased by accounting for the variation in the baseline distance resulting from the movement of the imaging elements at the time of each image generation.

Figure 4:
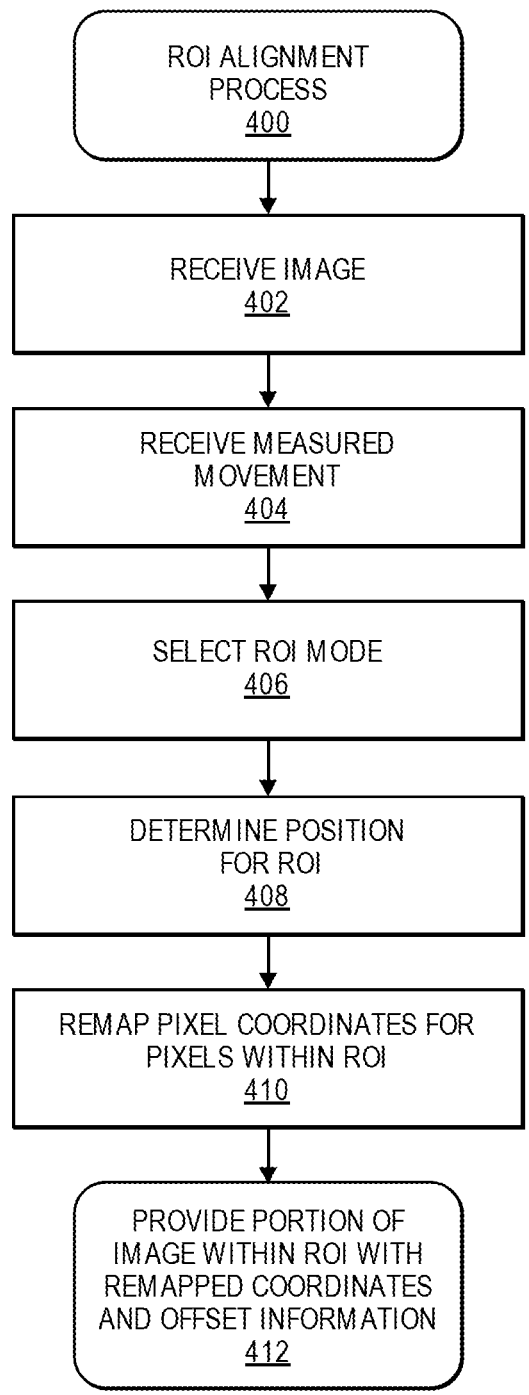
FIG. 4 is a flow diagram illustrating an example region of interest alignment process, according to an implementation.

FIG. 4 is a flow diagram illustrating an example process 400 for region of interest alignment, according to an implementation. The process of FIG. 4 and each of the other processes and sub-processes discussed herein may be implemented in hardware, software, or a combination thereof. In the context of software, the described operations represent computer-executable instructions stored on one or more computer-readable media that, when executed by the one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 400 begins upon receipt of an image generated by an imaging element in communication with a region of interest controller, as in 402. Likewise, a movement measured at the time the imaging element generated the received image is also received, as in 404. As discussed above, one or more movement sensors may be included on or incorporated into an imaging element and be configured to measure movement acting upon or affecting the imaging element at the time the imaging element generates the image.

Based on the movement information, a region of interest (ROI) mode is selected, as in 406. In some implementations, there may only be a single ROI mode that specifies a defined region of interest that is of a size that will include less than all of the pixels of an absolute pixel array. In other implementations, there may be multiple modes that may be selected based on, for example, the measured movement. For example, there may be three ROI modes, each mode corresponding to a different size region of interest. In a first ROI mode, the region of interest (a.k.a., ROI pixel array) may be the same size as the absolute pixel array of the image sensor. Such a mode may be utilized when there is no measured movement, or no measured movement over a period of time. A second ROI mode may correspond to a defined percentage (e.g., 85%) of the absolute pixel array of the image sensor. The second ROI mode may be utilized during operation when there is an expected or normal amount of movement acting upon or affecting the imaging elements of the stereo pair. For example, during operation of an aerial vehicle under normal environmental conditions, there may be range of movement that is considered within a tolerance threshold. If the measured movement is within the tolerance threshold, the second mode of operation may be utilized. A third ROI mode of operation may correspond to a smaller defined percentage (e.g., 50%) of the absolute pixel array of the image sensor. The third ROI mode may be utilized when the measured movement exceeds the tolerance threshold. Such movement may occur when the aerial vehicle is operating in adverse environments, such as high wind, rain, hail, etc., that cause excessive vibration of the imaging elements and/or bending/deflection of the frame of the aerial vehicle. By utilizing different ROI modes that include smaller portions of the entire absolute pixel array, the digital image produced from the selected region of interest and provided to the image sensor is stabilized over a series of sequentially provided images by shifting the position of the region of interest with respect to the absolute pixel array according to the measured movement. The smaller region of interest is desirable to allow for a greater shift of the region of interest within the absolute pixel array of the image sensor.

Returning to FIG. 4, a position for the region of interest is determined, as in 408. The position of the region of interest may be determined, for example, based on a difference between the movement and an original position of the imaging element. As another example, the position of the region of interest may be determined based on a difference between the position of the region of interest in a prior image (or a measured movement of the imaging element when generating a prior image) and the measured movement of the imaging element at the time the image was generated.

Based on the determined region of interest mode and position of the region of interest, the pixel coordinates for the pixels within the region of interest are remapped such that they correspond to the position of the region of interest, as in 410. Remapping of the pixel coordinates is discussed above with respect to FIG. 3. Alternatively, as discussed above, rather than remapping the pixels, metadata may be generated that is provided with the digital image indicating a size and position of the region of interest and/or indicating pixels included in the ROI pixel array.

Finally, a digital image corresponding to the pixels within the position of the region of interest is generated and provided for image processing, as in 412. In addition to providing the pixels within the region of interest, offset information indicating an amount of movement of the imaging element at the time of image generation may likewise be provided with the digital image.

Figure 5:
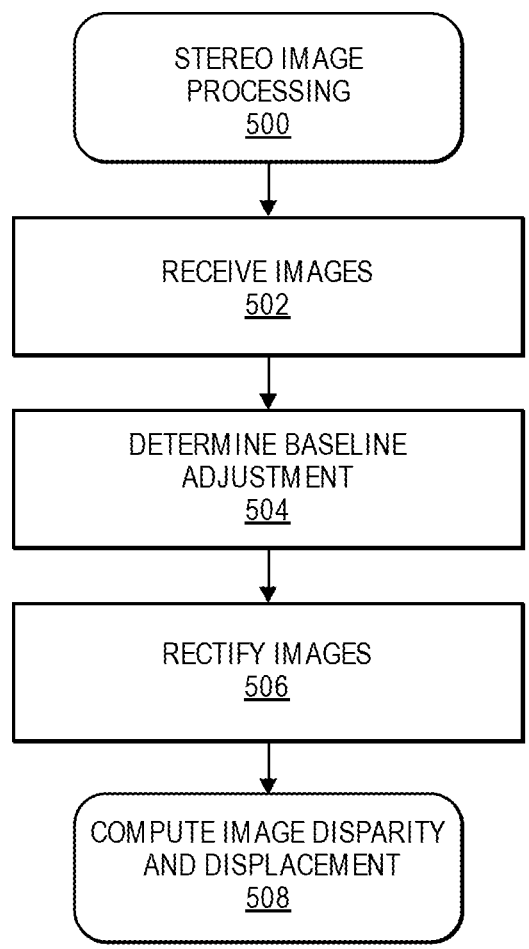
FIG. 5 is a flow diagram illustrating an example stereo imaging process, according to an implementation.

FIG. 5 is a flow diagram illustrating an example stereo imaging process 500, according to an implementation. The example process begins when the image processor receives digital images from each imaging element of a stereo pair, as in 502. As discussed above, the digital images sent to the image processor may be altered such that they only include pixels determined to be within the region of interest for each imaging element. Alternatively, the digital image may include all pixels generated by the image sensor of the imaging element and include metadata that indicates pixels that are within the region of interest. In such an example, the example process 500 may include extracting the pixels determined to be within the region of interest and utilizing those pixels as the digital image for the example process 500.

In addition to receiving the images, the example process also determines a baseline distance adjustment for the baseline distance between the two imaging elements of the stereo pair, as in 504. For example, if the two imaging elements have a baseline distance of 25.4 millimeters (mm) when in their original positions, the metadata of the digital image from the first imaging element indicates that the first imaging element moved 0.6 mm with respect to the original position of the first imaging element (i.e., away from the second imaging element), and the metadata of the digital image from the second imaging element indicates that the second imaging element moved −0.3 mm with respect to the original position of second imaging element (i.e., toward the first imaging element), the example process will alter the baseline distance to 25.7 mm (25.4 mm+0.6 mm−0.3 mm=25.7 mm).

In some implementations, the two received digital images may be rectified, as in 506. Image rectification is performed when the image planes of the two images are not co-planer to adjust the images as if they were co-planer. Image rectification is known in the art and need not be discussed in detail herein.

Finally, as discussed above, the pixels of the received digital images are correlated and image disparity and displacement of objects with respect to the position of the stereo camera are determined, as in 508. As discussed above, a variety of techniques may be utilized to correlate the images. Likewise, disparity and displacement are inversely proportional and can be computed based on the correlated pixels, focal length of the imaging elements and the baseline, which may be altered based on the measured movement of each imaging element.

While the examples discussed herein describe use of the implementations with an aerial vehicle, such as an unmanned aerial vehicle, it will be appreciated that the described implementations may likewise be used with other vehicles and/or in other scenarios. For example, stereo pairs with region of interest controllers may be beneficial in any scenario in which movement may act upon and/or affect one or more imaging elements of a stereo pair.

Likewise, while the example illustrates separate region of interest controllers for each imaging element and that the region of interest controller is distinct from the image processor, in other implementations, one or more of the region of interest controllers and/or the image processors may be combined. For example, a single region of interest controller may be utilized with each stereo pair, receiving images and separate movement information from each of the respective imaging elements. In another example, the image processor may include one or both of the region of interest controllers and perform the implementations discussed herein.

Figure 6:
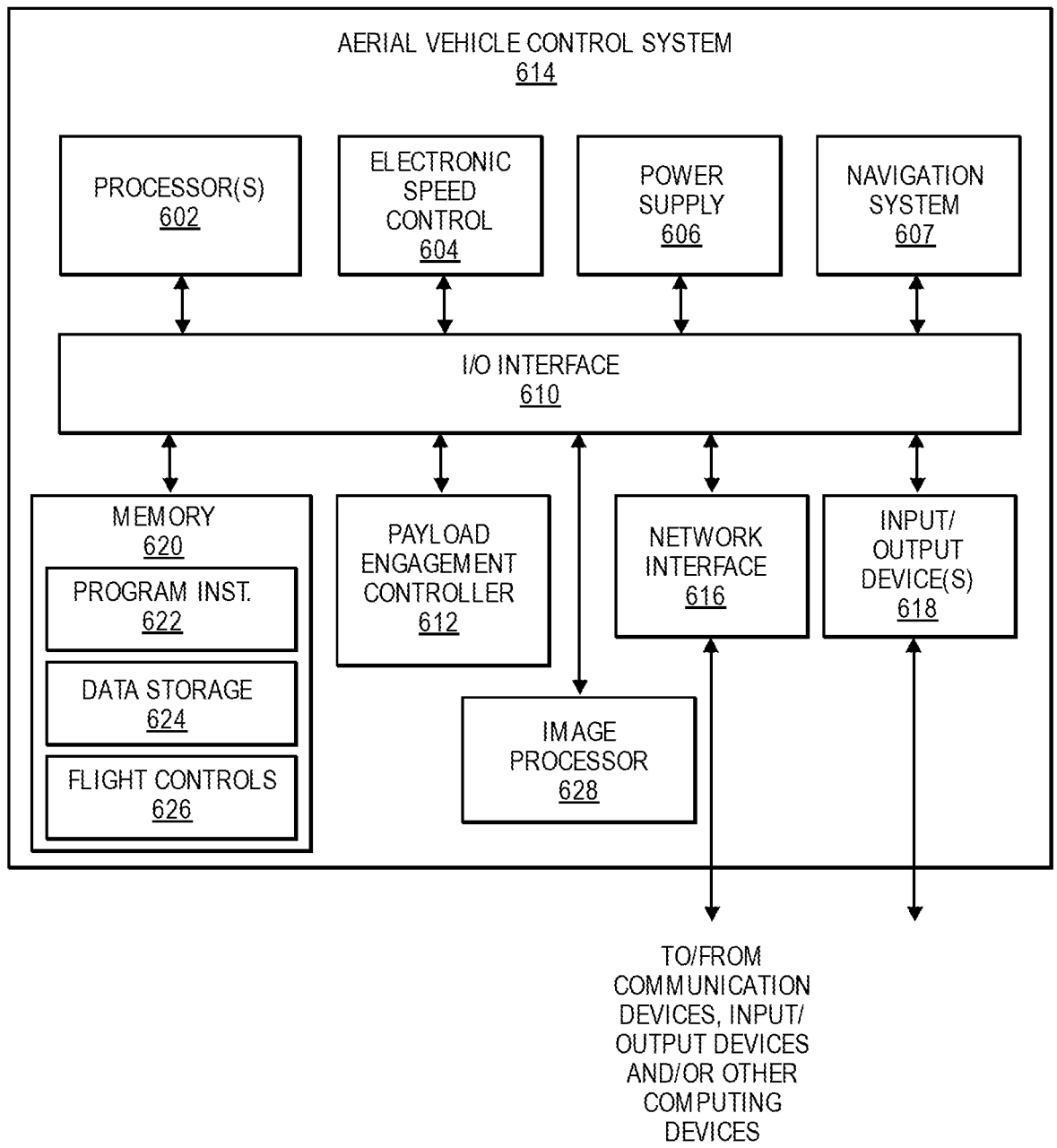
FIG. 6 is a block diagram of an illustrative implementation of an unmanned aerial vehicle control system that may be used with various implementations.

FIG. 6 is a block diagram illustrating an example aerial vehicle control system 614. In various examples, the block diagram may be illustrative of one or more aspects of the aerial vehicle control system 114 that may be used to implement the various systems and methods discussed herein and/or to control operation of the aerial vehicles described herein. In the illustrated implementation, the aerial vehicle control system 614 includes one or more processors 602, coupled to a memory, e.g., a non-transitory computer readable storage medium 620, via an input/output (I/O) interface 610. The aerial vehicle control system 614 may also include electronic speed controls 604 (ESCs), power supply modules 606, a navigation system 607, and/or a payload engagement controller 612. In some implementations, the navigation system 607 may include an inertial measurement unit (IMU). The aerial vehicle control system 614 may also include a network interface 616, and one or more input/output devices 618.

In various implementations, the aerial vehicle control system 614 may be a uniprocessor system including one processor 602, or a multiprocessor system including several processors 602 (e.g., two, four, eight, or another suitable number). The processor(s) 602 may be any suitable processor capable of executing instructions. For example, in various implementations, the processor(s) 602 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 602 may commonly, but not necessarily, implement the same ISA.

The non-transitory computer readable storage medium 620 may be configured to store executable instructions, data, flight paths, flight control parameters, and/or data items accessible by the processor(s) 602. Data items may include, for example, images obtained from one or more of the imaging elements, distance information, depth maps, etc.

In various implementations, the non-transitory computer readable storage medium 620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 620 as program instructions 622, data storage 624 and flight controls 626, respectively. In other implementations, program instructions, data, and/or flight controls may be received, sent, or stored upon different types of computer-accessible media, such as non-transitory media, or on similar media separate from the non-transitory computer readable storage medium 620 or the aerial vehicle control system 614. Generally speaking, a non-transitory, computer readable storage medium may include storage media or memory media such as magnetic or optical media, e.g., disk or CD/DVD-ROM, coupled to the aerial vehicle control system 614 via the I/O interface 610. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 616.

In one implementation, the I/O interface 610 may be configured to coordinate I/O traffic between the processor(s) 602, the non-transitory computer readable storage medium 620, and any peripheral devices, the network interface 616 or other peripheral interfaces, such as input/output devices 618. In some implementations, the I/O interface 610 may perform any necessary protocol, timing or other data transformations to convert data signals from one component (e.g., non-transitory computer readable storage medium 620) into a format suitable for use by another component (e.g., processor(s) 602). In some implementations, the I/O interface 610 may include support for devices attached through various types of peripheral buses, such as a variant of the Peripheral Component Interconnect (PCI) bus standard or the Universal Serial Bus (USB) standard, for example. In some implementations, the function of the I/O interface 610 may be split into two or more separate components, such as a north bridge and a south bridge, for example. Also, in some implementations, some or all of the functionality of the I/O interface 610, such as an interface to the non-transitory computer readable storage medium 620, may be incorporated directly into the processor(s) 602.

The ESCs 604 communicate with the navigation system 607 and adjust the rotational speed of each lifting motor and/or the thrusting motor to stabilize the UAV and guide the UAV along a determined flight path. The navigation system 607 may include a GPS, indoor positioning system (IPS), IMU or other similar systems and/or sensors that can be used to navigate the UAV 100 to and/or from a location. The payload engagement controller 612 communicates with actuator(s) or motor(s) (e.g., a servo motor) used to engage and/or disengage items.

The network interface 616 may be configured to allow data to be exchanged between the aerial vehicle control system 614, other devices attached to a network, such as other computer systems (e.g., remote computing resources), and/or with aerial vehicle control systems of other UAVs. For example, the network interface 616 may enable wireless communication between the UAV that includes the control system 614 and an aerial vehicle control system that is implemented on one or more remote computing resources. For wireless communication, an antenna of a UAV or other communication components may be utilized. As another example, the network interface 616 may enable wireless communication between numerous UAVs. In various implementations, the network interface 616 may support communication via wireless general data networks, such as a Wi-Fi network. For example, the network interface 616 may support communication via telecommunications networks, such as cellular communication networks, satellite networks, and the like.

Input/output devices 618 may, in some implementations, include one or more displays, imaging devices, thermal sensors, infrared sensors, time of flight sensors, accelerometers, pressure sensors, weather sensors, imaging elements (e.g., cameras), gimbals, landing gear, etc. Multiple input/output devices 618 may be present and controlled by the aerial vehicle control system 614. One or more of these sensors may be utilized to assist in landing as well as to avoid obstacles during flight.

As shown in FIG. 6, the memory may include program instructions 622, which may be configured to implement the example routines and/or sub-routines described herein. The data storage 624 may include various data stores for maintaining data items that may be provided for determining flight paths, landing, identifying locations for disengaging items, engaging/disengaging the thrusting motors, selecting a region of interest or ROI pixel array within an absolute pixel array, determining depth information, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

The aerial vehicle control system 614 may also include the image processor 628. As discussed above, the image processor communicates with the plurality of imaging elements and receives digital images that have been adjusted by a ROI controller of each imaging element. The received digital images are then processed by the image processor to determined image disparity, displacement information and/or other depth information for objects represented in the images.

Those skilled in the art will appreciate that the aerial vehicle control system 614 is merely illustrative and is not intended to limit the scope of the present disclosure. In particular, the computing system and devices may include any combination of hardware or software that can perform the indicated functions. The aerial vehicle control system 614 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 614. Some or all of the system components or data structures may also be stored (e.g., as instructions or structured data) on a non-transitory, computer-accessible medium or a portable article to be read by an appropriate drive. In some implementations, instructions stored on a computer-accessible medium separate from the aerial vehicle control system 614 may be transmitted to the aerial vehicle control system 614 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An aerial vehicle comprising:
a frame;
a first imaging element, including:
  a first image sensor that generates a first pixel array representative of at least a portion of a scene; and
  a first movement sensor configured to measure a first movement of the first imaging element; and
a second imaging element, including:
  a second image sensor that generates a second pixel array representative of at least a portion of the scene; and
  a second movement sensor configured to measure a second movement of the second imaging element; and
a region of interest controller configured to receive first movement information from the first movement sensor and determine a first region of interest within the first pixel array based at least in part on the first movement information, and configured to receive second movement information from the second movement sensor and determine a second region of interest within the second pixel array based at least in part on the second movement information;
an image processor in communication with the first imaging element and the second imaging element, the image processor configured to at least:
  receive from the first imaging element first image information corresponding to pixels of the first pixel array within the first region of interest;
  receive from the second imaging element second image information corresponding to pixels of the second pixel array within the second region of interest; and
  process the first image information and the second image information to generate depth information corresponding to an object represented in the first image information and the second image information.

2. The aerial vehicle of claim 1, wherein the first region of interest includes less than all of a plurality of pixels of the first pixel array.

3. The aerial vehicle of claim 1, wherein:
the first region of interest corresponds to a first plurality of pixels of the first pixel array, the first plurality of pixels being less than all of the pixels of the first pixel array; and
the second region of interest corresponds to a second plurality of pixels of the second pixel array, the second plurality of pixels being less than all of the pixels of the second pixel array.

4. The aerial vehicle of claim 3, wherein:
the depth information is determined based at least in part on a disparity between at least a first portion of the first plurality of pixels and a second portion of the second plurality of pixels.

5. An imaging element apparatus, comprising:
a first image sensor configured to generate first image information corresponding to a first field of view;
a first movement sensor configured to measure a first movement affecting the first image sensor;
a second image sensor configured to generate second image information corresponding to a second field of view;
a second movement sensor configured to measure a second movement affecting the second image sensor;
a region of interest controller in communication with the first movement sensor and configured to determine a first plurality of pixels corresponding to the first image sensor based at least in part on the first movement, and in communication with the second movement sensor and configured to determine a second plurality of pixels corresponding to the second image sensor based at least in part on the second movement; and
an image processor in communication with the region of interest controller, the image processor configured to at least process the first plurality of pixels and the second plurality of pixels to generate depth information corresponding to an object represented in the first plurality of pixels and the second plurality of pixels.

6. The imaging element of claim 5, wherein the region of interest controller provides to the image processor the first plurality of pixels and offset information corresponding to an offset of a first region of interest with respect to an original position of the first image sensor.

7. The imaging element of claim 6, wherein the first plurality of pixels is less than all pixels of the first image sensor.

8. The imaging element of claim 5, wherein the region of interest controller provides to the image processor all pixels of the first image sensor and a first region of interest position information corresponding to the first plurality of pixels.

9. The imaging element of claim 5, wherein a size of a first region of interest is determined based at least in part on an amount of the first movement.

10. The imaging element of claim 9, wherein a first size of the first region of interest is determined to comprise all pixels of the first image sensor based at least in part on the amount of the first movement being substantially no movement; and
wherein a second size of the first region of interest is determined to comprise approximately half the pixels of the first image sensor based at least in part on the amount of the first movement exceeding a movement tolerance threshold.

11. The imaging element of claim 5, wherein:
the first image sensor and the second image sensor are separated by a known baseline distance;
the depth information is determined based at least in part on the known baseline distance; and the known baseline distance is altered, prior to the determination of the depth information, based at least in part on a first offset distance corresponding to a first region of interest.

12. The imaging element of claim 11, wherein the first offset distance is a difference between an original position of the first image sensor and a distance of the first movement.

13. The imaging element of claim 11, wherein the first offset distance is determined based at least in part on a difference between the first movement and a prior movement measured by the first movement sensor at a prior time.

14. The imaging element of claim 5, wherein the region of interest controller sends to the image processor the first plurality of pixels without sending pixels of the first image sensor that are not included in the first plurality of pixels.

15. The imaging element of claim 5, wherein:
the first field of view and the second field of view at least partially overlap; and
the object is represented in the first plurality of pixels and the second plurality of pixels.

16. The imaging element of claim 5, wherein the region of interest controller is further configured to at least:
remap coordinates of the first plurality of pixels such that the first plurality of pixels are sent to the image processor as representative of an image generated by the first image sensor.

17. A method, comprising:
obtaining at a first time and with a first imaging element a first image;
obtaining at the first time and with a second imaging element a second image;
determining a first movement affecting the first imaging element at the first time;
determining based at least in part on the first movement, a first region of interest within the first image; and
processing the first region of interest and the second image to determine depth information corresponding to an object represented in each of the first region of interest and the second image.

18. The method of claim 17, further comprising:
determining a second movement affecting the second imaging element at the first time;
determining based at least in part on the second movement, a second region of interest within the second image; and
wherein processing includes processing the first region of interest and the second region of interest to determine depth information corresponding to the object.

19. The method of claim 18, wherein the depth information corresponds to a disparity computed between pixels of the first region of interest and pixels of the second region of interest.

20. The method of claim 17, wherein the first region of interest is a subset of a plurality of pixels of the first image.

* * * * *